May 19, 1964
F. C. MOCK
3,133,416
BRAKING SYSTEM FOR GAS TURBINE DRIVEN LAND VEHICLES
Filed Nov. 20, 1958
7 Sheets-Sheet 1
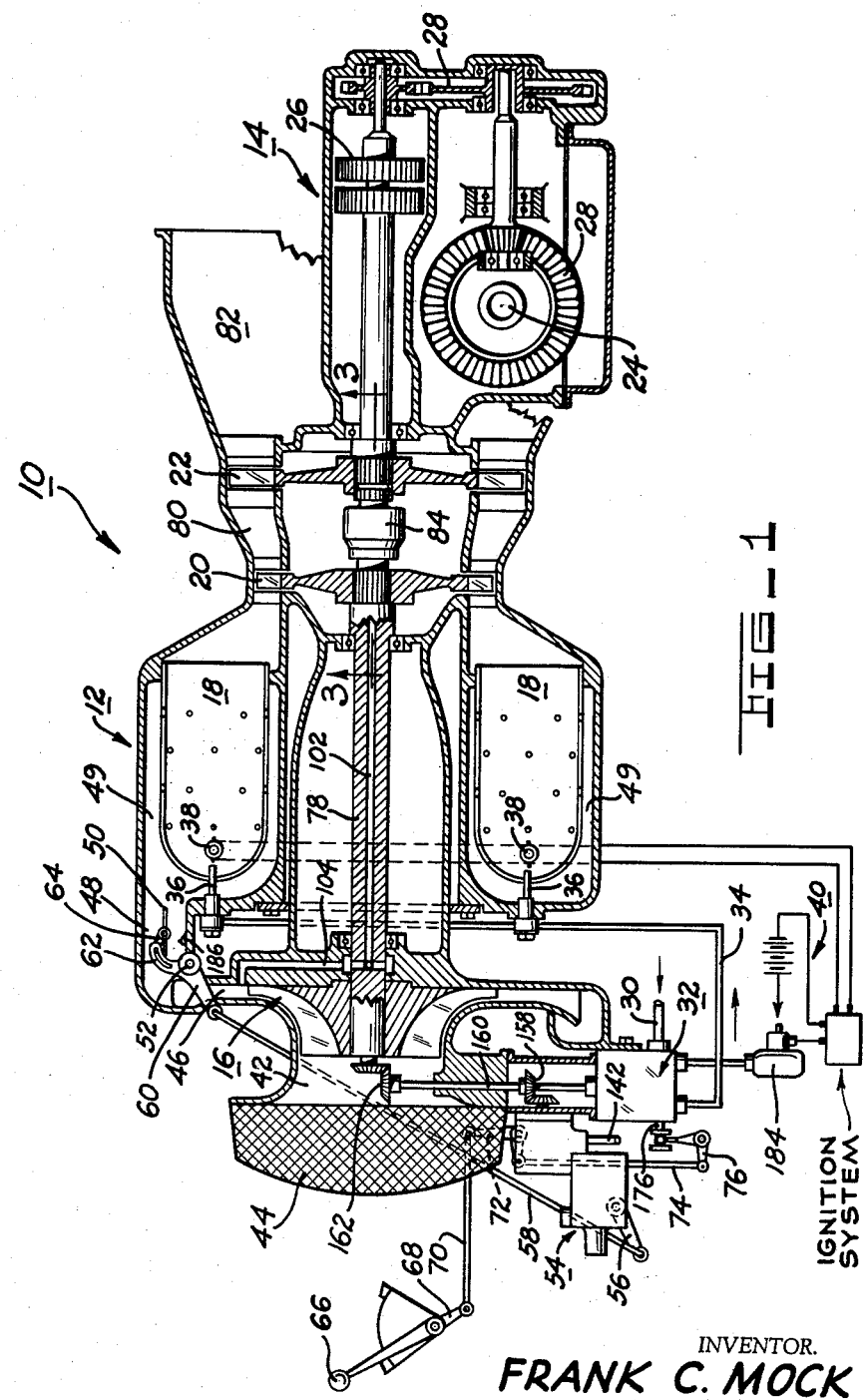
INVENTOR.
FRANK C. MOCK
BY
James L. O'Brien
ATTORNEY.

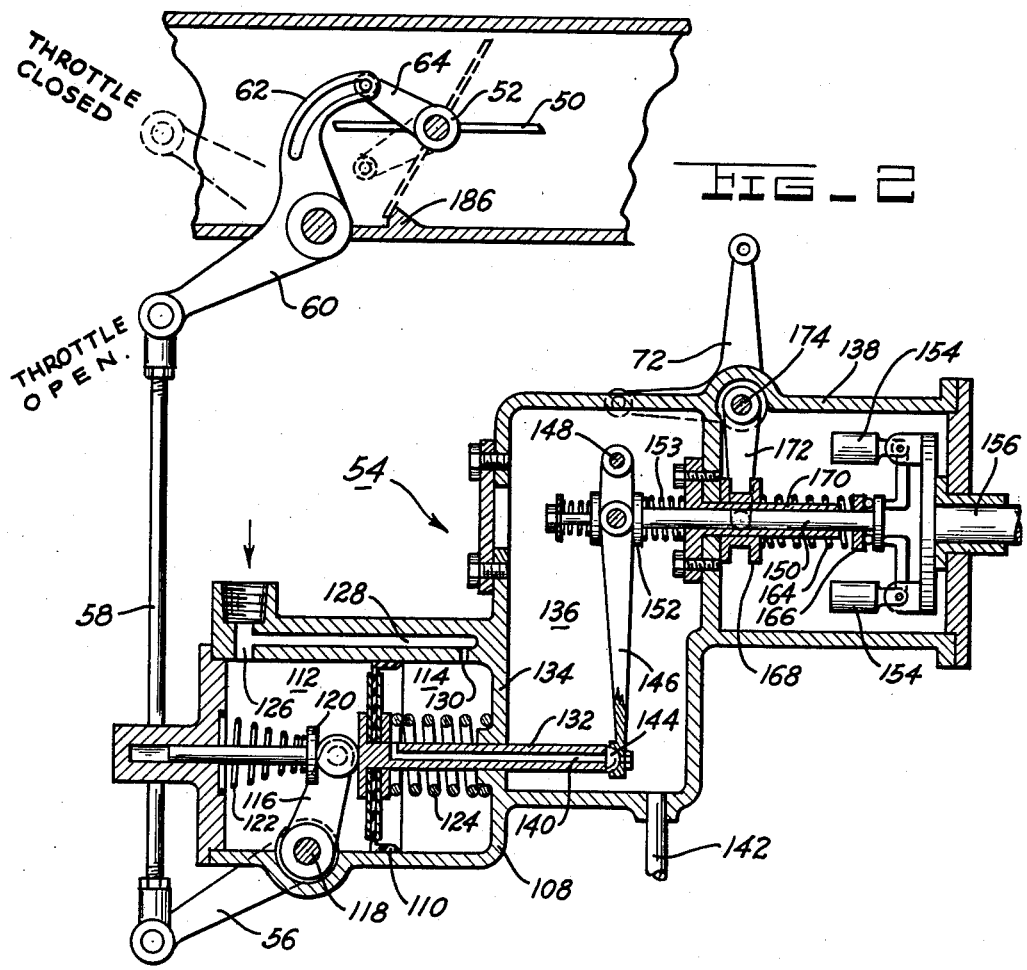
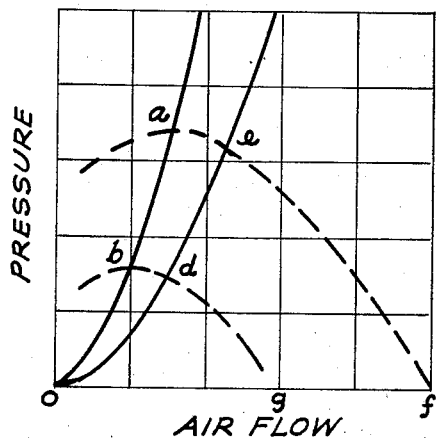

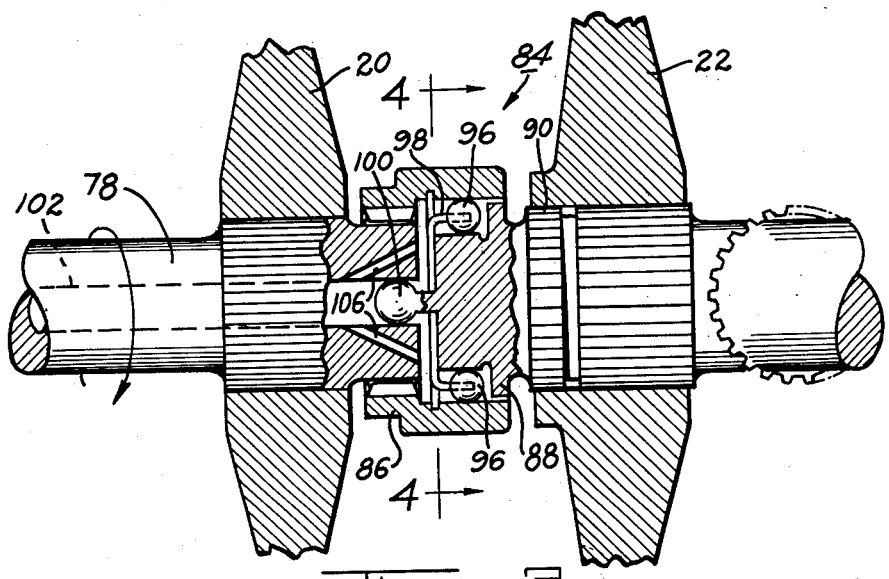
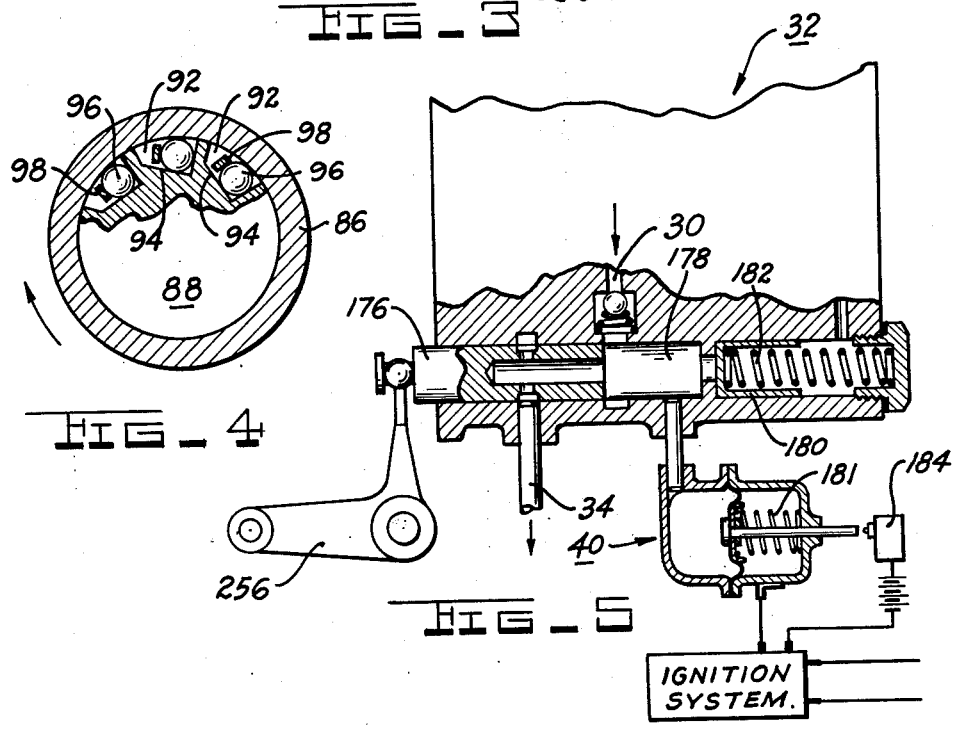
INVENTOR.
FRANK C. MOCK.
BY
James L. O'Brien
ATTORNEY.

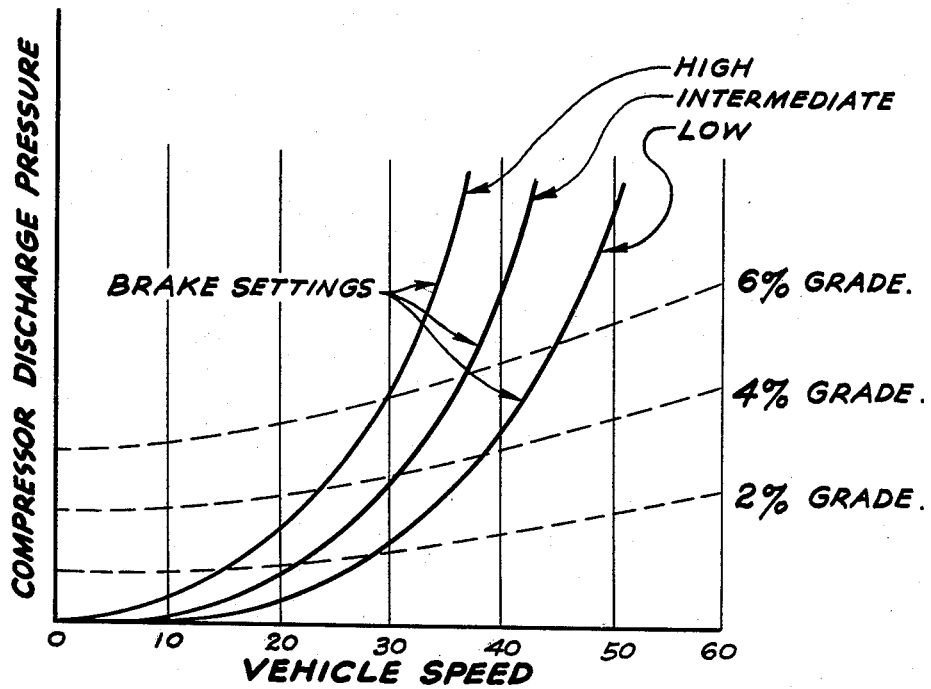
FIG_7
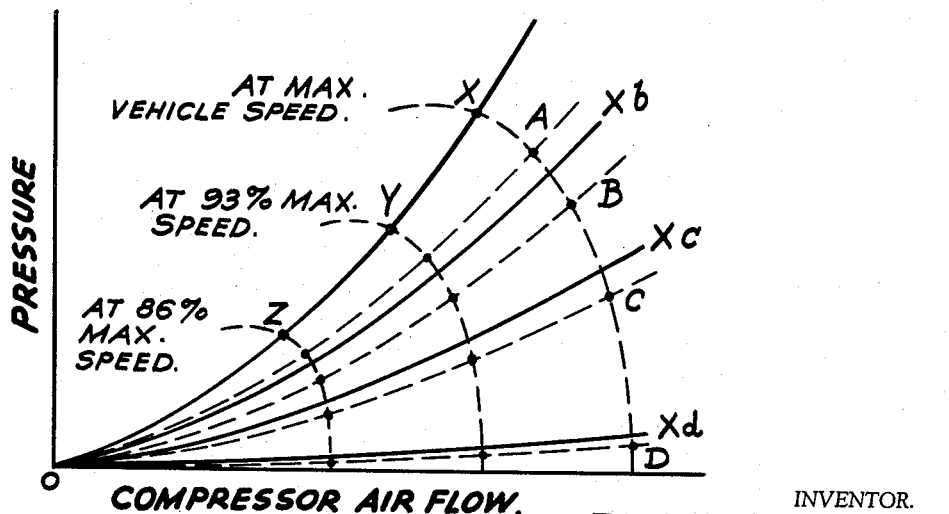
FIG_11

May 19, 1964            F. C. MOCK            3,133,416
BRAKING SYSTEM FOR GAS TURBINE DRIVEN LAND VEHICLES
Filed Nov. 20, 1958            7 Sheets-Sheet 5
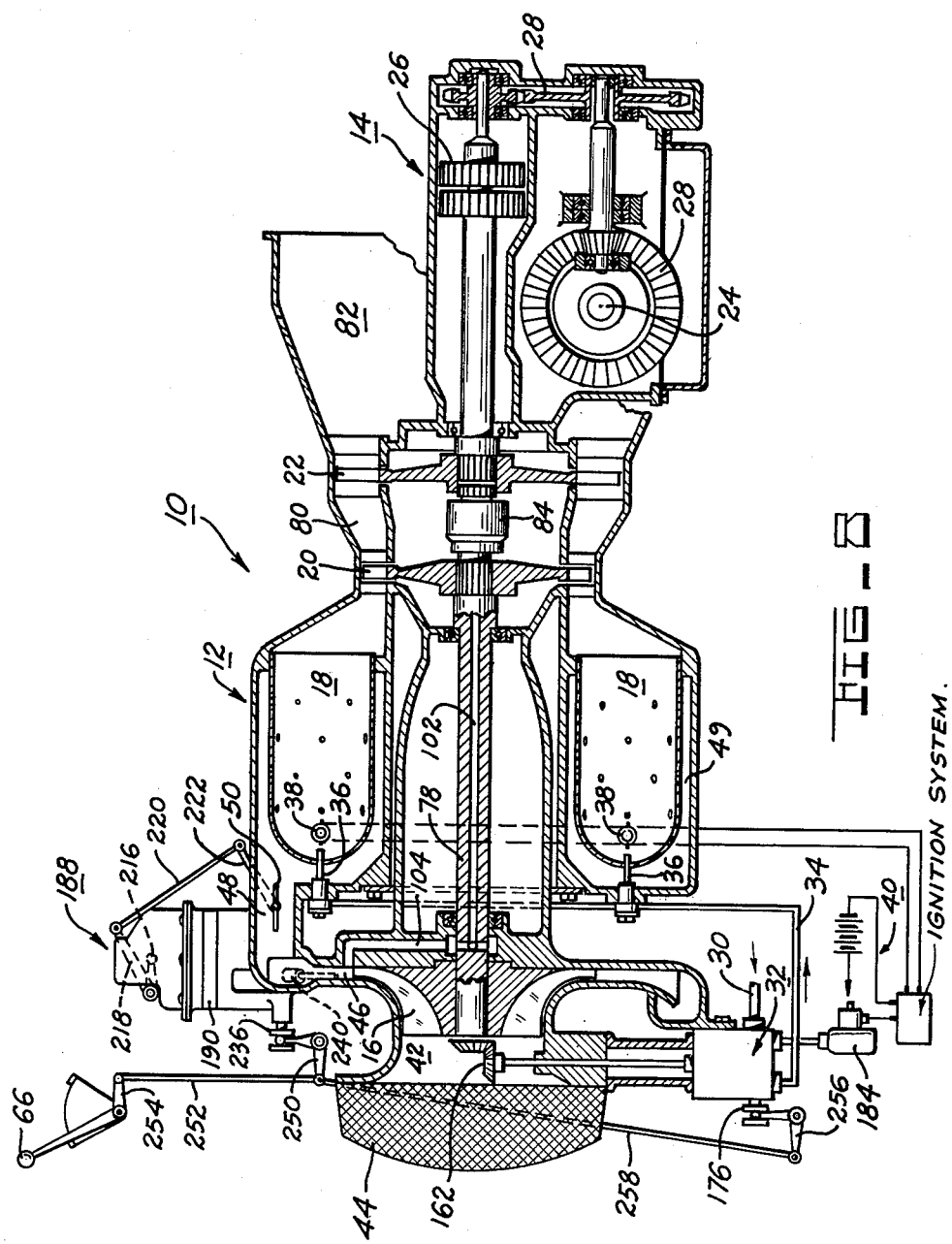
INVENTOR.
FRANK C. MOCK
BY
James L. O'Brien
ATTORNEY.

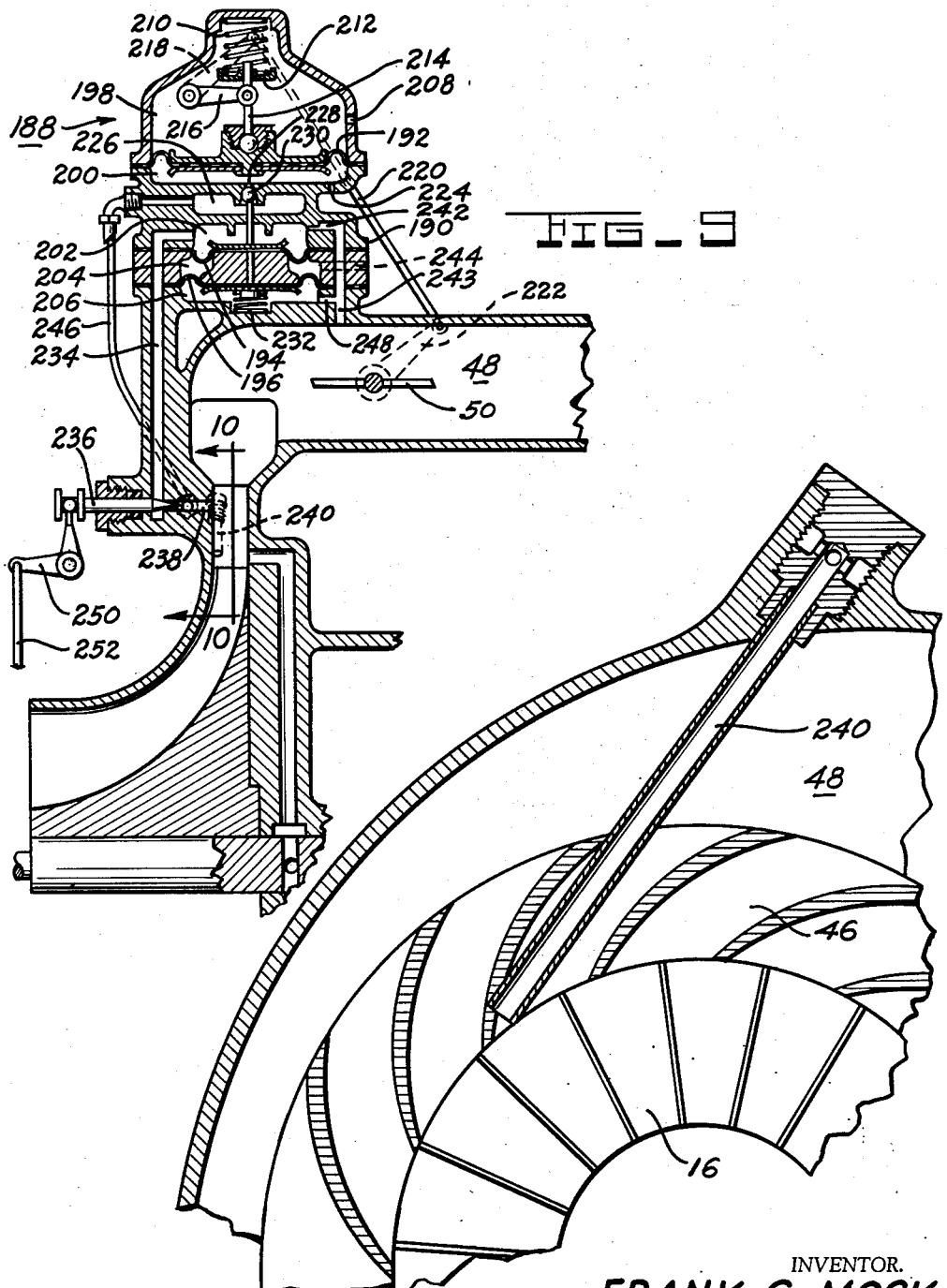

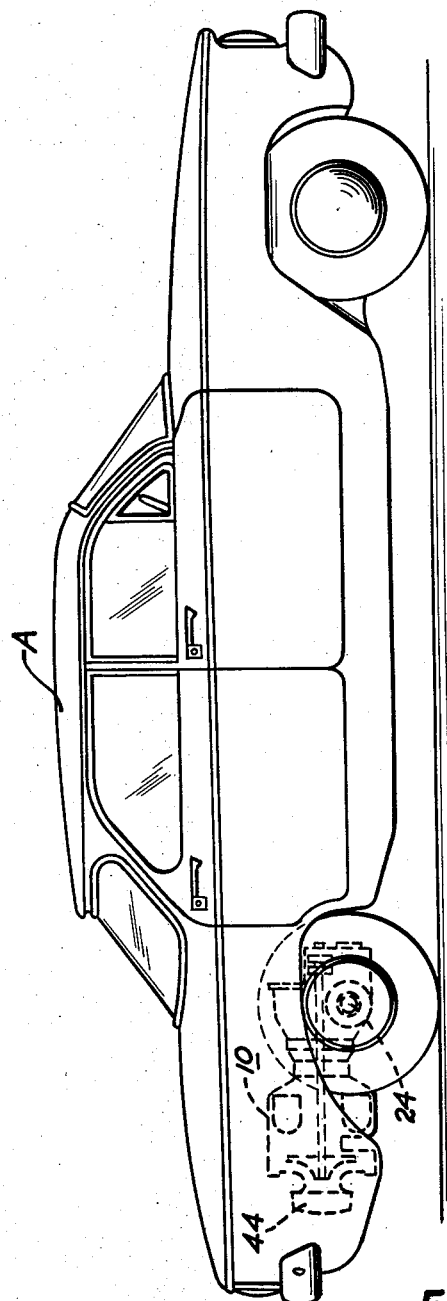

United States Patent Office 3,133,416
Patented May 19, 1964

3,133,416
BRAKING SYSTEM FOR GAS TURBINE DRIVEN
LAND VEHICLES
Frank C. Mock, South Bend, Ind., assignor to The Bendix
Corporation, a corporation of Delaware
Filed Nov. 20, 1958, Ser. No. 775,207
4 Claims. (Cl. 60—39.16)

The present invention relates to a braking system for gas turbine driven land vehicles wherein the gas turbine engine is utilized to provide a braking or retarding force to vehicle movement.

It is an object of the present invention to provide control means for a gas turbine driven land vehicle operable to permit the vehicle to drive the engine.

Another object of the invention is to provide an engine braking system for a gas turbine engine wherein the braking force may be selectively varied.

A further object of the invention is to provide control means for a gas turbine engine braking system which avoids compressor stall or surge.

Another object of the invention is to provide a braking system for a gas turbine engine wherein the braking torque will be automatically regulated as a function of vehicle speed to facilitate coasting down long variable grades in mountainous country.

These and other objects and advantages of the present invention will become readily apparent from the following detailed description taken in connection with the appended drawings in which:

FIGURE 1 is a schematic view of a gas turbine engine embodying the present invention;

FIGURE 2 is a sectional view of the throttle control mechanism shown in FIGURE 1;

FIGURE 3 is a sectional view taken along line 3—3 of FIGURE 1;

FIGURE 4 is a view partly in section taken along line 4—4 of FIGURE 3;

FIGURE 5 is an enlarged view partially in section of the fuel control shown in FIGURE 1;

FIGURES 6 and 7 are graphs showing certain operating characteristics of the gas turbine engine shown in FIGURE 1;

FIGURE 8 is a schematic view of a gas turbine engine having another embodiment of the present invention;

FIGURE 9 is a sectional view of the throttle control shown in FIGURE 8;

FIGURE 10 is an enlarged view taken along line 10—10 of FIGURE 9;

FIGURE 11 is a graph showing certain operating characteristics of the gas turbine engine shown in FIGURE 8; and FIGURE 12 is a view showing the gas turbine engine of FIGURE 1 mounted in a land vehicle.

Referring now to the drawings and more particularly to FIGURE 1, numeral 10 designates a gas turbine engine having a gasifier section 12 and a power section 14. The gasifier section includes a compressor 16, combustion chambers 18 and turbine 20. The power section includes a turbine 22 drivingly connected to the drive shaft 24 of a land vehicle A, FIGURE 12, through a clutch 26 and suitable reduction and change gears 28.

Fuel is supplied from a source (not shown) through conduit 30 to a fuel control 32 and thence by means of conduit 34 to fuel nozzles 36 which are disposed to discharge fuel into combustion chambers 18. Igniter plugs 38 are located in the combustion chambers 18 adjacent fuel nozzles 36 for energization by an ignition system designated generally by the numeral 40.

The gasifier section is provided with an air inlet 42 having a filter 44 mounted thereon. Compressor 16 discharges through a diffuser section 46 and duct 48 to an annular space 49 and thence to the combustion chambers 18. A throttle 50 is mounted in duct 48 on a shaft 52. A throttle control unit designated generally by the numeral 54 is connected to the throttle valve by means of crank 56, link 58 and lever 60, cam 62 and throttle lever 64. A manual brake control lever 66 is connected to the throttle control unit by means of lever 68, link 70 and lever 72 and is connected to the fuel control unit 32 by means of link 74 and crank 76. Compressor 16 is driven by turbine 20 through shaft 78.

Turbine 22 in the power section 14 is driven by the discharge from the gasifier section 12 which is conveyed through a passage 80 past turbine 22 to the engine exhaust 82. A one-way connecting device 84 operatively connects turbines 20 and 22.

As best seen in FIGURE 3 the one-way connection 84 comprises a hub 86 splined to turbine shaft 78. A driving member 88 is received in hub 86 and is connected to turbine 22 by means of splines 90. Driving member 88 is provided with a plurality of sockets 92 as best seen in FIGURE 4, which are provided with inclined surfaces 94. Each of the sockets 92 carries a ball or bearing member 96 which is held in the position shown in FIGURE 4 by means of a light spring member 98. Driving member 88 is also provided with a spherical projection 100 which is received within a bore 102 formed in shaft 78. A passage 104, shown in FIGURE 1, connects bore 102 to the discharge side of compressor 16 whereby fluid discharged from compressor 16 may be conveyed via passage 104, bore 102 and conduits 106 to the one-way connection 84 to provide cooling means for said connection.

Referring now to FIGURE 2, the throttle control unit 54 includes a housing 108 having a movable wall or piston 110 mounted therein to divide the interior thereof into chambers 112 and 114. A lever 116 projects into chamber 112 and is mounted on a shaft 118 for rotation with lever 56. Lever 116 is urged into engagement with the end of piston 110 so as to follow the movements thereof by a plunger 120 which is actuated by a relatively light spring 122. A stronger spring 124 in chamber 114 urges piston 110 to the left in opposition to spring 122, as shown in FIGURE 2, to urge throttle 50 toward open position. The chamber 112 is connected to a source of fluid pressure, such as the engine lubricating oil supply (not shown), by means of a conduit 126. Chamber 114 is connected to conduit 126 by means of passage 128 and restriction 130. A stem 132 is secured to piston 110 and projects through wall 134 of housing 108 into a chamber 136 formed in the housing 138. A passage 140 is drilled in stem 132 to connect chamber 114 with chamber 136. A conduit 142 connects chamber 136 with a drain or source of lower pressure. Flow through passage 140 is controlled by a half-ball valve 144 secured to a lever 146 which is rotatably mounted on a shaft 148. A governor shaft 150 is pivotally connected to lever 146 and is provided with a flange 152 against which a relatively light spring 153 reacts to urge lever 146 in a direction to bring valve 144 into engagement with the end of passage 140. A pair of governor weights 154 are mounted on a shaft 156 for rotation as a function of engine speed through gears 158, shaft 160 and gears 162. A governor spring 164 encircles governor shaft 150 and reacts between a bearing member 166 which is secured to one end of the shaft and a sleeve 168 which is slidably mounted on the governor shaft guide member 170. Sleeve 168 is actuated by forked lever 172 which is secured from a shaft 174 for actuation by lever 72 as operated by control lever 66. In the position shown, spring 164 is under very little compression, and at the first rotation of the engine the governor weights can readily close ball valve 144 and permit spring 124 to hold throttle valve 50 full open. When sleeve 168 is moved to the right, following movement of control lever 66 to the right, governor spring 164 is compressed thereby urging lever 146 to open valve 144 and permit fluid from chamber 114 to bleed through passage 140 into chamber 136 and out through drain 142. When valve 144 is opened the fluid pressure in chamber 112 moves piston 110 to the right thereby causing throttle 50 to be moved toward closed position. The governor weights 154 acting on bearing 166 urge lever 146 in a direction to close valve 144 thereby equalizing the pressures in chambers 112 and 114 whereby spring 124 is effective to locate throttle 50 in some partially open position which is determined as a function of compressor shaft speed and control lever 66 setting.

Referring now to FIGURE 5, the fuel control 32 may be of any suitable type and includes a valve 176 which controls the flow of fuel through the outlet conduit 34. When the gas turbine engine is operating normally, valve 176 is in the open position as shown in FIGURE 5. When it is desired to have the engine act as a brake, the lever 66 is moved to the right as shown in FIGURE 1 thereby moving valve 176 to the left so that the first part of its travel shuts off the fuel supply to the engine. Valve 176 is reciprocably disposed in a cylinder 178 in which is also mounted a spring loaded pump piston 180. When valve 176 is moved to the left to shut off the fuel supply to the engine the chamber 178 remains filled with fuel fed through the check valve in port 30. To restart the engine after braking, as lever 66 is moved to the left, valve 176 is moved to the right to re-establish the fuel supply to the engine and move piston 180 to the right. Upon the completion of the travel of valve 176, spring 182 forces pump piston 180 to the left to discharge a supplementary quantity of fuel through the outlet conduit 34 to aid in starting the engine. A pressure switch 184 is operatively connected to cylinder 178 and adapted to be actuated by the pressure therein when pump 180 is discharging. The closing of switch 184 energizes the ignition system 40 to restart the engine. Pressure switch 184 returns to its normally open position upon completion of the discharge stroke of pump piston 180 by the action of spring 181, which is weaker than spring 182, but stronger than the normal fuel feed pressure.

In operation of the device thus far described, when the brake lever 66 is in the off position as shown in FIGURE 1 and the gasifier section is delivering power, the one-way connection between the gasifier section 12 and power section 14 is ineffective and the power turbine 22 will be driven by the discharge from the gasifier section. With a load applied from the vehicle drive shaft 24 to turbine 22 the power turbine will normally run at a slower speed than the gasifier turbine 20. When it is desired to utilize engine braking, the lever 66 is moved to the right thereby actuating valve 176 to cut off the flow of fuel to the engine and coordinately setting up the governor spring 164 so that throttle 50 is moved toward closed position. The power turbine will be driven by the vehicle and overspeed the gasifier turbine 20 whereupon the one-way connection 84 becomes effective to mechanically drive the gasifier section. The power required to drive the gasifier section is a function of compressor discharge pressure. Compressor discharge pressure, as best seen in FIGURE 6, varies as a function of engine speed and air flow. By closing the outlet throttle 50 to restrict air flow the compressor discharge pressure may be increased thereby increasing, within certain limits, the power required to drive the engine. As shown in the graph of FIGURE 6, compressor discharge pressure or braking torque at any given discharge area varies substantially as the square of engine speed and may at its maximum value be represented by the curve *abo*. The compressor discharge pressure may be varied from substantially zero when the throttle is wide open to the maximum value by progressively closing the throttle: see dotted line *aef* for maximum speed and dotted line *bdg* for .7 maximum speed. The area of the graph to the left of the maximum pressure line *abo* represents a region of possible compressor stall and surge. It is therefore essential to limit the closing of the throttle 50 so that the braking air flow is never sufficiently throttled to bring the range of operation to the left of the maximum pressure curve *abo*. In the embodiment thus far described cam 62 is contoured to schedule the position of throttle 50 in accordance with the output of throttle control unit 54 to limit the maximum obtainable compressor discharge pressure to values which will follow the curve *edo* of FIGURE 6. Curve *edo* is to the right of the maximum pressure curve *abo* and well out of the compressor stall range. A throttle stop 186 may also be provided to positively limit the closing of throttle 50 to provide additional security that the compressor stall zone will be avoided. The amount of braking effort may be selected by positioning lever 66 in various intermediate positions between the off position shown in FIGURE 1 and the maximum position when the lever 66 is completely to the right.

In FIGURE 7 typical results of the engine braking system are shown related to engine speed. If the brake control lever 66 were positioned in a low position and the vehicle were descending a 2% grade the vehicle speed would be limited to approximately 30 m.p.h. With the same low brake setting, if the vehicle should encounter a 4% down grade the vehicle speed would gradually increase to approximately 38 m.p.h.; or by setting control 66 to its "intermediate" setting, the 4% grade speed could be still limited to 30 m.p.h. It is to be noted that the braking torque increases approximately as the square of engine or vehicle speed. Increased braking torque may also be obtained by shifting the vehicle gears 28 to a lower ratio whereby for a given vehicle speed the engine speed will increase over the high gear engine speed when the vehicle is driving the engine.

Referring now to the embodiment shown in FIGURES 8–10 the gas turbine engine is identical to the previous embodiment and similar parts have been designated by similar numbers. In this embodiment throttle control unit 188 comprises a housing 190 containing three diaphragms or movable walls designated respectively 192, 194 and 196 which divide the interior of housing 190 into chambers 198, 200, 202, 204 and 206. Chamber 198 is vented to ambient pressure through port 208. A spring 210 in chamber 198 acts against retainer 212 and rod 214 to urge diaphragm 192 downwardly. Rod 214 is connected by means of levers 216, 218, 220 and 222 with throttle 50. Chamber 200 is connected to ambient pressure through a restricted orifice 224 and to a chamber 226 by means of passage 228. A valve 230 operatively connected to diaphragms 194 and 196 is disposed to control the flow through passage 228. A spring 232 urges valve 230 toward closed position. Chamber 202 is connected by means of conduit 234, valve 236, conduit 238 with an impact tube 240. Tube 240 is disposed within the compressor discharge duct 48 with its tip adjacent the periphery of compressor 16 at an angle approximating the average angle at which the air comes off the compressor 16 over the normally encountered engine speeds. The pressure existing in tube 240 is a measure of the total compressor discharge pressure. Valve 236 regulates the amount of the total compressor discharge pressure which is applied to diaphragm 194. Chamber 202 is vented to compressor static discharge pressure through restricted orifice 242 and passage 243. A port 244 connects chamber 204 with ambient pressure. A passage 246 connects conduit 238 anterior valve 236 with chamber 226. Chamber 206 is connected to the compressor discharge duct 48 anterior of the throttle 50 by means of passage 243 and port 248 whereby diaphragm 196 is subjected to the static compressor discharge pressure. Valve 236 is connected to brake control lever 66 by means of crank 250, link 252 and lever 254. Fuel valve 176 in fuel control unit 32 is connected to brake control lever 66 by means of crank 256, links 258, 252 and lever 254.

In operation of the embodiment shown in FIGURES 8–10, when engine braking is desired, brake control lever 66 is moved to the right which coordinately moves fuel valve 176 to shut off the fuel supply to the combustion chambers and thereby extinguish combustion therein and then actuate the valve 236 to give the selected degree of braking effort. The throttle control unit 188 is responsive to the differential between total compressor discharge pressure and static compressor discharge pressure to control the throttle 50 to give the desired braking effort and at all times avoiding the compressor stall and/or surge region. As shown in FIGURE 11 the maximum compressor discharge pressure is represented by the curve xyzo. This curve corresponds to curve abo of FIGURE 6. In order to maintain the selected pressure at all times below the maximum pressure line so as to avoid compressor stall, diaphragm 194, which is responsive to total compressor discharge pressure, is made smaller than diaphragm 196 which is responsive to static pressure. The differential in area of the two diaphragms permits the throttle control unit 188 to sense an excess over this selected ratio between total compressor discharge pressure and static compressor discharge pressure and is constructed to open throttle 50 when that ratio is decreased to a value indicating possible incipient compressor stall conditions. With valve 236 wide open maximum permissible braking effort is obtained and is represented by the curve A in FIGURE 11. It is to be noted that curve A lies below curve xyzo by amount equal to the ratio of the areas of diaphragms 194 and 196. Lesser degrees of braking effort may be obtained as the brake control lever 66 is moved from the extreme right position toward the left position. The curves $X_B$, $X_C$ and $X_D$ represent intermediate pressures obtained in the chamber 202, with different positions of the valve 236. The curves B, C and D respectively correspond to the braking effort obtained at pressures in chamber 202 corresponding to $X_B$, $X_C$ and $X_D$.

Spring 210 urges valve 50 toward a normally open position. When the brake control lever 66 is actuated to move valve 236 toward open position the pressure from impact tube 240 is applied to diaphragm 194 to move valve 230 downwardly permitting pressure in chamber 226 to be transmitted through passage 228 to chamber 200 to act on diaphragm 192 to urge valve 50 toward closed position. The static pressure in chamber 206 acts on diaphragm 196 to urge valve 230 toward closed position in opposition to the impact pressure acting on diaphragm 194.

While only two embodiments of my invention have been shown and described it will be readily apparent to those skilled in the art that various changes and modifications may be made without departing from the spirit of my invention.

I claim:

1. A braking system for a gas turbine engine having a compressor and a compressor discharge duct, a combustion section receiving air from said duct, a first turbine drivingly connected to said compressor and receiving combustion products from said combustion section and a second turbine with output shaft means normally independently rotatable from said first turbine and receiving exhausting combustion products therefrom comprising, a throttle in said duct, an impact tube in said duct disposed adjacent the periphery of said compressor, a movable wall, conduit means for subjecting said wall to the pressure in said tube, a second movable wall, conduit means for subjecting said second wall to the static pressure in said duct anterior to said throttle, means operatively connecting said walls to said throttle for regulating the position of said throttle in accordance with the ratio between the pressure in said tube and the static pressure in said duct, a valve in said conduit means for regulating the pressure applied to said first mentioned wall, control means for coordinately opening said valve and extinguishing combustion in said combustion section, and a one-way connection between said first and second turbines whereby said second turbine drives said first turbine when said control means is effective to extenguish combustion and said second turbine overspeeds said first turbine.

2. A braking system for a gas turbine engine having a source of fluid pressure, a compressor, a combustion section, and a compressor driving turbine comprising means for extinguishing combustion in said combustion section, a throttle for controlling compressor discharge pressure, a housing, a movable wall in said housing dividing the interior thereof into first and second chambers, cam means adapted to actuate said throttle, means connecting said wall and said cam, resilient means urging said wall in a direction to open said throttle, conduit means connecting said first chamber with said source of fluid pressure, passage means connecting said second chamber with said source, a bleed passage connecting said second chamber to a point of pressure lower than said source pressure, a valve in said bleed passage openable to reduce the pressure in said second chamber whereby the pressure in said first chamber is effective to urge said wall in a direction to close said throttle, governor weights driven as a function of engine speed operatively connected to said valve to urge said valve toward closed position, a governor spring opposing said weights, manual control means for coordinately actuating said first mentioned means and regulating said governor spring.

3. An engine braking system for an engine having a compressor, a combustion chamber, a turbine driven by the products of combustion from said combustion chamber arranged to drive said compressor comprising conduit means for supplying fuel to said combustion chamber, a valve in said conduit, throttle means controlling the entire flow from said compressor for regulating the discharge pressure of said compressor, a governor means driven as a function of compressor speed controlling said throttling means, and manual means operative to sequentially close said valve and adjust said governor means to urge said throttle means toward closed position.

4. A braking system for a vehicle having a source of fuel and a gas turbine engine including a compressor, a combustion chamber, and a compressor driving turbine comprising vehicle drive means, connecting means between said engine and said vehicle drive means whereby said engine when operative drives said vehicle drive means and when inoperative is driven by said vehicle drive means, a conduit adapted to connect said combustion chamber to said source of fuel, valve means in said conduit, manual means for actuating said valve means to close said conduit and cut off fuel to said combustion chamber and render said engine inoperative to drive said vehicle drive means, throttling means actuated by said manual means coordinately with said valve means for throttling the compressor discharge to increase the work required from said vehicle drive means to drive said compressor, and means responsive to compressor speed operatively connected to said throttling means for limiting the compressor discharge pressure to a predetermined value at each compressor speed.

References Cited in the file of this patent

UNITED STATES PATENTS

| | | |
|---|---|---|
| 1,210,030 | Baumann | Dec. 16, 1916 |
| 2,139,090 | Lysholm et al. | Dec. 6, 1938 |
| 2,552,231 | Streid et al. | May 8, 1951 |
| 2,591,540 | Grylls | Apr. 1, 1952 |
| 2,613,500 | Lysholm | Oct. 14, 1952 |
| 2,618,926 | Pfenninger | Nov. 25, 1952 |
| 2,659,382 | Ifield | Nov. 17, 1953 |
| 2,660,033 | Bowden et al. | Nov. 24, 1953 |
| 2,670,033 | Ray | Feb. 23, 1954 |
| 2,670,598 | Van Millingen | Mar. 2, 1954 |

(Other references on following page)

UNITED STATES PATENTS

| | | |
|---|---|---|
| 2,673,556 | Reggio | Mar. 30, 1954 |
| 2,711,074 | Howard | June 21, 1955 |
| 2,715,313 | Fleming et al. | Aug. 16, 1955 |
| 2,795,928 | Huebner et al. | June 18, 1957 |
| 2,811,302 | Hodge et al. | Oct. 29, 1957 |
| 2,813,672 | Long et al. | Nov. 19, 1957 |
| 2,837,894 | Kind | June 10, 1958 |
| 2,850,122 | Alishouse | Sept. 2, 1958 |
| 2,933,236 | Mathieson | Apr. 19, 1960 |
| 3,037,348 | Gassman | June 5, 1962 |

FOREIGN PATENTS

| | | |
|---|---|---|
| 840,938 | Germany | June 9, 1952 |
| 1,023,638 | Germany | Jan. 30, 1958 |
| 256,079 | Switzerland | Feb. 1, 1949 |